(12) United States Patent
Hole et al.

(10) Patent No.: US 8,565,148 B2
(45) Date of Patent: Oct. 22, 2013

(54) SYSTEM AND METHOD FOR MOBILE COMMUNICATIONS

(75) Inventors: David Hole, Southampton (GB); Satish Venkob, Waterloo (CA); Rene Faurie, Versailles (FR); William Owen Parry, Waterloo (CA)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/458,763

(22) Filed: Apr. 27, 2012

(65) Prior Publication Data

US 2012/0213194 A1    Aug. 23, 2012

Related U.S. Application Data

(60) Division of application No. 13/244,735, filed on Sep. 26, 2011, which is a continuation of application No. PCT/CA2011/050299, filed on May 13, 2011.

(30) Foreign Application Priority Data

May 14, 2010 (EP) .................................... 10305512

(51) Int. Cl.
H04B 7/212 (2006.01)
(52) U.S. Cl.
USPC ........... 370/321; 370/337; 370/347; 370/442; 370/458; 370/498
(58) Field of Classification Search
USPC .......... 370/252, 337, 347, 442, 458, 480, 498
See application file for complete search history.

(56) References Cited

U.S. PATENT DOCUMENTS

| | | | |
|---|---|---|---|
| 2004/0151156 A1 | 8/2004 | Noel et al. | |
| 2007/0104175 A1 | 5/2007 | Pecen et al. | |
| 2009/0163158 A1* | 6/2009 | Chitrapu et al. | ........... 455/127.5 |
| 2009/0168709 A1 | 7/2009 | Hole et al. | |
| 2009/0274079 A1* | 11/2009 | Bhatia et al. | ................ 370/310 |
| 2009/0296665 A1* | 12/2009 | Provvedi et al. | .............. 370/336 |
| 2009/0310563 A1 | 12/2009 | Chou et al. | |
| 2010/0069065 A1* | 3/2010 | Sambhwani et al. | ......... 455/434 |
| 2011/0053519 A1 | 3/2011 | Jarabek | |

FOREIGN PATENT DOCUMENTS

| | | |
|---|---|---|
| EP | 1758273 | 2/2007 |
| WO | 2007112762 | 10/2007 |

OTHER PUBLICATIONS

European Patent Office, Communication pursuant to Article 94(3) EPC, issued for European Patent Application No. 10305512.5, on Sep. 19, 2012, 8 pages.
United States Patent and Trademark Office, Advisory Action, issued for U.S. Appl. No. 13/244,735, on Sep. 28, 2012, 3 pages.

(Continued)

Primary Examiner — Alvin Zhu
(74) Attorney, Agent, or Firm — Hanley, Flight & Zimmerman LLC (57) ABSTRACT

Systems and methods for mobile communications are disclosed herein. An example method for a mobile station includes receiving first data from a carrier on a first frequency using a first receiver of the mobile station in a first timeslot, tuning a second frequency of the carrier using the second receiver while the first receiver is receiving the first data during the first timeslot, and receiving second data from the carrier on the second frequency using the second receiver during a second timeslot that immediately follows the first timeslot, wherein the mobile station receives data on all timeslots without each of two time division multiple access frames.

18 Claims, 6 Drawing Sheets

(56) References Cited

OTHER PUBLICATIONS

Eupoean Patent Office, Extended European Search Report, for EP Patent Application serial No. 12166872.7, dated Jul. 5, 2012, 10 pages.
3GPP TSG GERAN#33: "Downlink Dual Carrier Mobiles in Single Carrier Networks", GP-070187, Seoul, South Korea, Feb. 12-16, 2007, 4 pages.
Patent Cooperation Treaty, Notification of Transmittal of the International Search Report and the Written Opinion of the International Searching Authority, or the Declaration, issued for corresponding international application No. PCT/CA2011/050299, mailed on Aug. 4, 2011, 8 pages.
Telefon AB LM Ericsson et al, "Change Request, DCDL for EFTA", GP-101357, 3GPP TSG-GERAN Meeting #47, Kunming, China, Aug. 30-Sep. 3, 2010, 7 pages.
3GPP TS 24.008 V 10.2.0, Mobile Radio Interface Layer 3 Specification, 3rd Generation Partnership Project, Technical Specification Group Core Network and Terminals, Core Network Protocols, Stage 3, (Release 10), Mar. 2011, 334 pages.
European Patent Office, partial European search report, issued for the corresponding European patent application No. 10305512.5-2412, dated Nov. 12, 2010, 6 pages.
European Patent Office, extended European search report, issued for the corresponding European patent application No. 10305512.5-2412, dated Feb. 7, 2011, 13 pages.
Telefon AB LM Ericsson et al, "Change Request, Interpretation of Multislot Class Parameters for EFTA", GP-100341, 3GPP TSG GERAN Meeting #45, Kunming, China, Mar. 1-5, 2011, 9 pages.
3G Americas, Evolved Edge Update (Edge II), powerpoint presentation, Apr. 2007, 18 pages.
United States Patent and Trademark Office, Non-Final Office Action, for U.S. Appl. No. 13/244,735, issued on Feb. 23, 2012, 11 pages.
United States Patent and Trademark Office, Final Office Action, for U.S. Appl. No. 13/244,735, issued on Jul. 11, 2012, 10 pages.
United States Patent and Trademark Office, "Notice of Panel Decision from Pre-Appeal Brief Review," issued in connection with U.S. Appl. No. 13/244,735, mailed on Nov. 29, 2012 (2 pages).
United States Patent and Trademark Office, "Non-Final Rejection," issued in connection with U.S. Appl. No. 13/244,735, on Feb. 5, 2013 (17 pages).
International Bureau, "International Preliminary Report on Patentability," issued in connection with application No. PCT/CA2011/050299, mailed on Nov. 29, 2012 (7 pages).
Notice of Allowance and Fee(s) Due, issued by the United States Patent and Trademark Office in connection with U.S. Appl. No. 13/244,735, on Jun. 24, 2013, 6 pages.

\* cited by examiner

SYSTEM AND METHOD FOR MOBILE COMMUNICATIONS

TECHNICAL FIELD

The following relates to systems and methods for mobile communications.

BACKGROUND

Data transmission rates for mobile devices have increased in part due to the development of networks. One such development is the Enhanced Data Rates for GSM Evolution (EDGE), also known as Enhanced GPRS (EGPRS). It is a backward-compatible digital mobile phone technology that allows for improved data transmission rates as an extension on top of standard Global System for Mobile communications (GSM).

As another upgrade to both GSM and EDGE, the introduction of EDGE Evolution or Evolved EDGE will further increase data transmission rates. One such feature of Evolved EDGE is the Downlink Dual Carrier (DLDC), which allows a mobile device to receive data on two different frequency channels at the same time, doubling the downlink throughput.

BRIEF DESCRIPTION OF THE DRAWINGS

Embodiments will now be described by way of example only with reference to the appended drawings wherein.

DETAILED DESCRIPTION OF THE DRAWINGS

An example mobile station disclosed herein includes hardware and software stored on a tangible computer readable medium that, during operation, cause the mobile station to receive first data from a carrier on a first frequency using a first receiver of the mobile station in a timeslot, tune a second frequency of the carrier using the second receiver while the first receiver is receiving the first data during the timeslot, and receive second data from the carrier on the second frequency using the second receiver during a different timeslot that immediately follows the timeslot.

In some implementations, the hardware and software further causes the mobile station to receive data on all timeslots within each of two consecutive time division multiple access frames, wherein the frequencies of each of the two time division multiple access frames are different. In some implementations of the mobile station, the hardware and software further cause the mobile station to simultaneously perform a neighbor cell measurement using the second receiver while the first receiver is receiving the first data. In some such implementations, the neighbor cell measurement is performed during the timeslot of the time division multiple access frame.

In some implementations of the mobile station, the hardware and software further cause the mobile station to transmit an indication to the carrier that the mobile station supports fast downlink frequency switching. In some implementations, the carrier uses frequency hopping. In some implementations, the hardware and software further cause the mobile station to tune a third frequency of the carrier using the first receiver while the second receiver is receiving the second data during the different timeslot.

Another example mobile station includes hardware and software stored on a tangible computer readable medium that, during operation, cause the mobile station to establish a communication session with a communication network and send mobile station capability information element to the network, wherein the mobile station capability information element includes an element indicating a multislot reduction for dual carrier operation for enhanced flexible timeslot assignment. In some implementations, the element indicating the multislot reduction for dual carrier operation for enhanced flexible timeslot assignment is an enhanced flexible timeslot assignment multislot capability reduction for downlink dual carrier information element. In some implementations, the dual carrier operation is downlink dual carrier operation.

In some implementations, the mobile station capability information element further includes a second an element indicating a multislot reduction for dual carrier operation for non-enhanced flexible timeslot assignment operation. In some implementations of the mobile station, the hardware and software cause the mobile station to calculate the element indicating the multislot reduction for dual carrier operation for enhanced flexible timeslot assignment.

In some such implementations, the hardware and software cause the mobile station to calculate the element indicating the multislot reduction for dual carrier operation for enhanced flexible timeslot assignment by determine a maximum number of receive timeslots for a signaled multislot class of the mobile station, determine a maximum number of receive timeslots supported by the mobile station during enhanced flexible timeslot assignment, and determine the multislot reduction for dual carrier operation for enhanced flexible timeslot assignment by subtracting the maximum number of receive timeslots supported by the mobile station during enhanced flexible timeslot assignment from the maximum number of receive timeslots for the signaled multislot class of the mobile station.

In other implementations, the hardware and software cause the mobile station to calculate the element indicating the multislot reduction for dual carrier operation for enhanced flexible timeslot assignment by determine a maximum number of receive timeslots for an alternative enhanced flexible timeslot assignment multislot class of the mobile station, determine a maximum number of receive timeslots supported by the mobile station during enhanced flexible timeslot assignment, and determine the multislot reduction for dual carrier operation for enhanced flexible timeslot assignment by subtracting the maximum number of receive timeslots supported by the mobile station during enhanced flexible timeslot assignment from the maximum number of receive timeslots for an alternative enhanced flexible timeslot assignment multislot class of the mobile station.

In other implementations, the hardware and software cause the mobile station to calculate the element indicating the multislot reduction for dual carrier operation for enhanced flexible timeslot assignment by determine a maximum number of receive timeslots for an alternative enhanced flexible timeslot assignment multislot class of the mobile station, determine a maximum number of receive timeslots for a signaled multislot class of the mobile station, determine a maximum number of receive timeslots supported by the mobile station, determine a maximum number of receive timeslots supported by the mobile station during enhanced flexible timeslot assignment, determine a reduction value by subtracting the maximum number of receive timeslots supported by the mobile station from the maximum number of receive timeslots for the signaled multislot class of the mobile station, and determine the multislot reduction for dual carrier operation for enhanced flexible timeslot assignment by subtracting the reduction value and the maximum number of receive timeslots supported by the mobile station during enhanced flexible timeslot assignment from the maximum number of receive timeslots for the alternative enhanced flexible timeslot assignment multislot class of the mobile station.

In some implementations of the mobile station, the hardware and software further cause the mobile station to omit the element indicating the multislot reduction for dual carrier operation for enhanced flexible timeslot assignment from the mobile station capability information element when the mobile station is capable of receiving fewer than the maximum number of receive timeslots for a signaled multislot class of the mobile station. In some implementations, the hardware and software further cause the mobile station to omit the element indicating the multislot reduction for dual carrier operation for enhanced flexible timeslot assignment from the mobile station capability information element and include a multislot reduction for downlink dual carrier value of reserved for future use when the mobile station is capable of receiving the maximum number of receive timeslots for an alternative enhanced flexible timeslot assignment class for the mobile station.

Methods and apparatus to implement the implementations of the mobile station are also disclosed.

Figure 1:
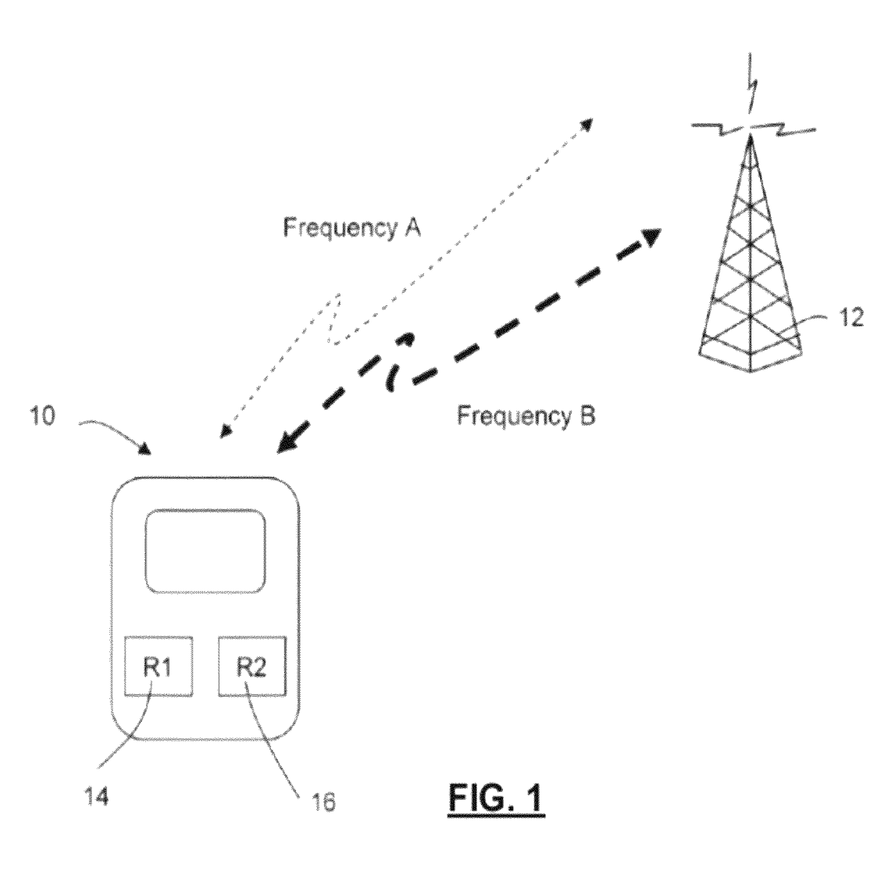
FIG. 1 is a schematic diagram illustrating a mobile device exchanging data on two different radio frequency channels.

Turning to FIG. 1, a mobile device 10 (e.g., mobile station (MS)) is shown communicating with a wireless base station 12. The mobile device 10 is able to exchange data communications with another entity through one or more of such base stations 12 of a wireless network. The exchange of wireless data is illustrated by the dotted lines.

The mobile device 10 is capable of utilizing radio receiver equipment 14 and 16. The radio receiver equipments 14 and 16 may share some receiver components. Alternatively, the radio receiver equipments 14 and 16 could be two independent radio receivers. In the illustrated example, the radio receiver equipment 14 and 16 are denoted as 'R1' and 'R2' respectively. The radio receiver equipment 14 and 16 enable the mobile device 10 to simultaneously receive data at different frequencies, to simultaneously tune to two different frequencies, to perform neighbor cell measurements, and/or any combination of these procedures. For example, for a network supporting downlink dual carrier (DLDC), a mobile device 10 that supports DLDC can receive data on two carriers (frequencies) simultaneously. Alternatively, as described in further detail herein, when a mobile device 10 that includes the dual radio receiver equipment 14 and 16 is in communication with a single carrier system, the mobile device 10 may utilize the dual radio receiver equipment 14 and 16 to increase communication rates in the presence of a frequency hopping network. For example, when the base station 12 uses frequency hopping at time division multiple access (TDMA) frames on one or more of the carriers, the radio receiver equipment 14 may be used to receive data and, before the downlink carrier hops frequencies, the radio receiver equipment 16 may tune to the next frequency so that it will be ready to receive data during the next frame reception. The second receiver may additionally perform neighboring cell measurement or base station identity code (BSIC) decoding activity prior to receiving data in the next TDMA frame. Accordingly the switching time defined for the mobile station multislot class can be reduced to zero or almost zero when frequency hopping is used to allow the use of 8 downlink slots per TDMA communication frame. During the next frame, the roles of the dual radio receiver equipment 14 and 16 are then reversed.

When the mobile device 10 is operating in DLDC mode with a network, the amount of data received and, hence, the amount of data that must be processed by the mobile device 10 is increased. Accordingly, while the communication system of the mobile device 10 may be able to receive communications on a certain number of timeslots per TDMA frame (e.g., 16), the processing system of the mobile device 10 may not be able to process the data in a timely manner. Accordingly, as explained in further detail below, the mobile device 10 may signal the network that a reduced number of slots should be used when operating in DLDC mode.

In the illustrated example, at least one of the radio receiver equipments 14, 16 comprises a transmitter so that the mobile device 10 can transmit data. In other embodiments, each of the radio receiver equipments 14, 16 contain both a receiver and transmitter, or a transceiver. In this way, it can be appreciated that the mobile device 10 may be able to transmit, as well as receive simultaneously at different frequencies.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system to the mobile device 10.

Figure 2:
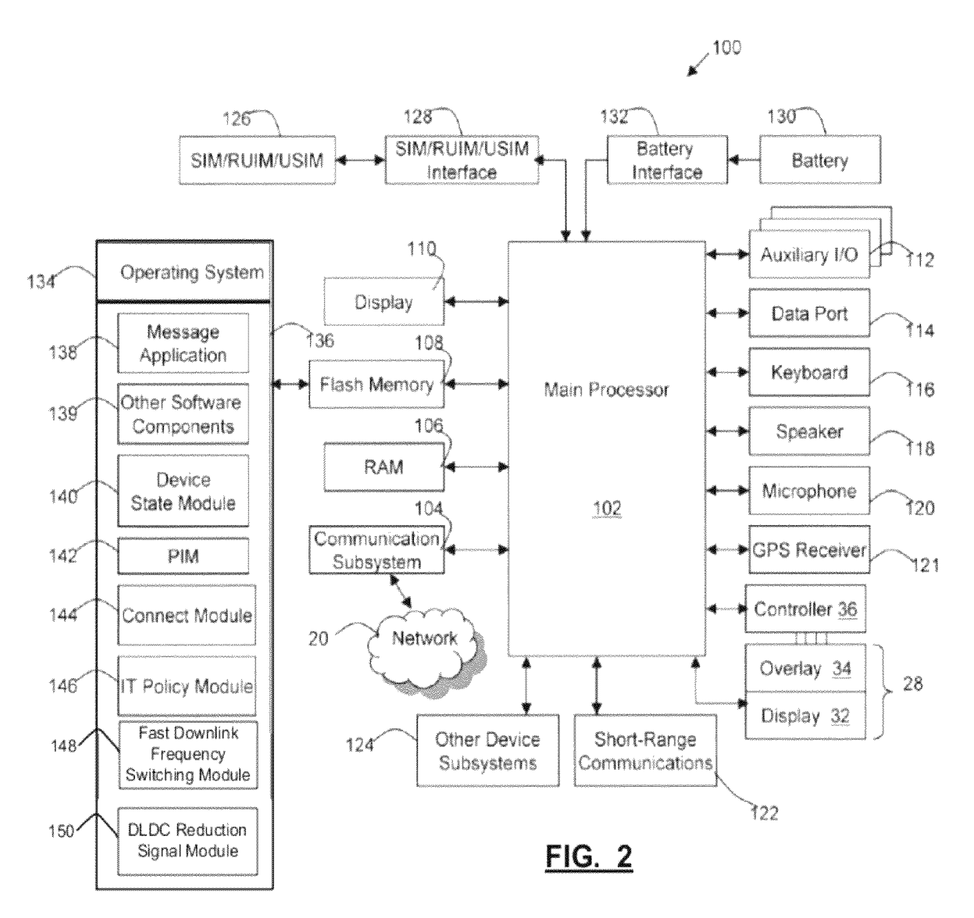
FIG. 2 is a block diagram of an exemplary embodiment of a mobile device.

An exemplary configuration for the mobile device 10 is illustrated in FIG. 2. Referring first to FIG. 2, shown therein is a block diagram of an exemplary embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives data from and sends data to a wireless network 20. In this exemplary embodiment of the mobile device 10, the communication subsystem 104 is configured in accordance with the GSM and GPRS standards, which are used worldwide. Other communication configurations that are equally applicable are, for example, Evolved EDGE or EDGE Evolution, as discussed above. New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146, a fast downlink frequency switching module 148, and a DLDC reduction signal module 150. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

The fast downlink frequency switching module 148 of the illustrated example controls the operation of the communication subsystem 104 to enable the mobile device 100 to use multiple receivers (e.g., dual radio receiver equipment 14 and 16 as shown in FIG. 1) with a single carrier using frequency hopping to reduce switching time. In particular, when two receivers are present (e.g., in a DLDC capable mobile device), the example fast downlink frequency switching module 148 causes a second receiver to perform a neighborhood cell measurement and tune to an upcoming frequency while the first receiver is receiving data on a current frequency when, for example, a neighborhood cell measurement is not needed. Alternatively, the fast downlink frequency switching module 148 may cause the second receiver to tune to the upcoming frequency without performing a neighborhood cell measurement. Accordingly, when the network hops to the upcoming frequency, the mobile device 100 can immediately receive data using the second receiver without waiting for the first receiver to tune to the new frequency. Subsequently, the first receiver can prepare for the next hop and the cycle continues. An example process to implement the fast downlink frequency switching module 148 is described in conjunction with the flowchart of FIG. 3.

The DLDC reduction signal module 150 of the illustrated example signals the network with a reduction of timeslots value for the mobile device 100. The reduction of timeslots value is used to signal the reduced capabilities of the mobile device 100 due to the reception of additional timeslots during DLDC mode operation (i.e., receiving the maximum number of timeslots (e.g., twice as many time slots) using each of the receivers). The reduction of timeslots value is a number by which the maximum number of timeslots for the associated multislot class must be reduced to determine the timeslot capability of the mobile device 100. For example, when the multislot class assigned to the mobile device 100 indicates that the mobile device can support up to 8 timeslots per frame per receiver and the mobile device uses two receivers to have a theoretical maximum of 16 timeslots per frame, the DLDC reduction signal module 150 may determine that the reduction of timeslots value is 4 because the mobile device 100 is only capable of processing 12 (16−4=12) timeslots per frame (e.g., due to decoding or processing overhead). The DLDC reduction signal module 150 of the illustrated example sends a first reduction of timeslots value for the non-EFTA operation mode of the mobile device and a second reduction of timeslots value for the EFTA operation mode of the mobile device to provide the network with an indication of the capabilities of the mobile device 100 in each operation mode because the capabilities of the mobile device 100 may be different in each mode. An example process to implement the DLDC reduction signal module 150 is described in conjunction with the flowchart of FIG. 5.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay 34 on the display 32 that are part of the touch screen display 28, in addition to possibly the auxiliary I/O subsystem 112. The auxiliary I/O subsystem 112 may include devices such as: a mouse, track ball, infrared fingerprint detector, or a roller wheel with dynamic button pressing capability.

Figure 3:
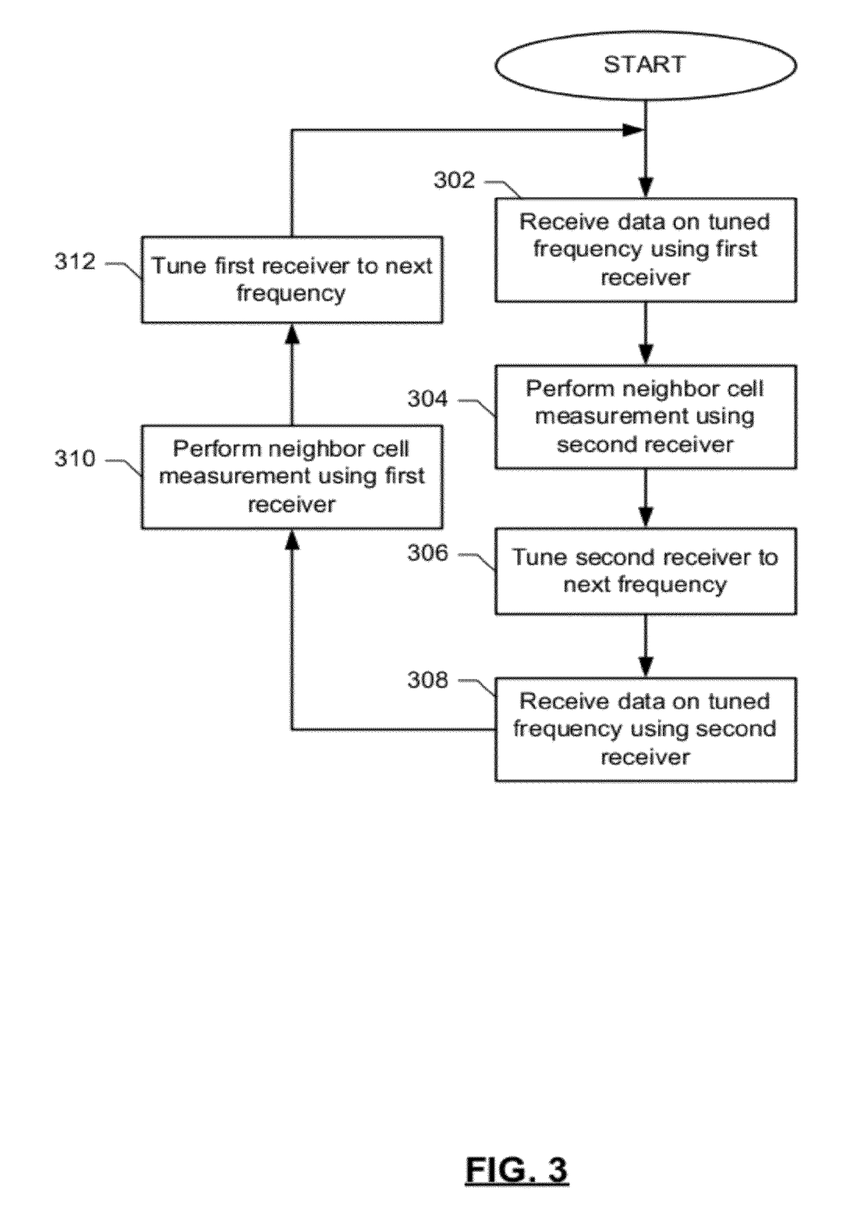
FIG. 3 is a flowchart illustrative of an example process that may be used to implement the fast downlink frequency switching module of FIG. 2.
Figure 5:
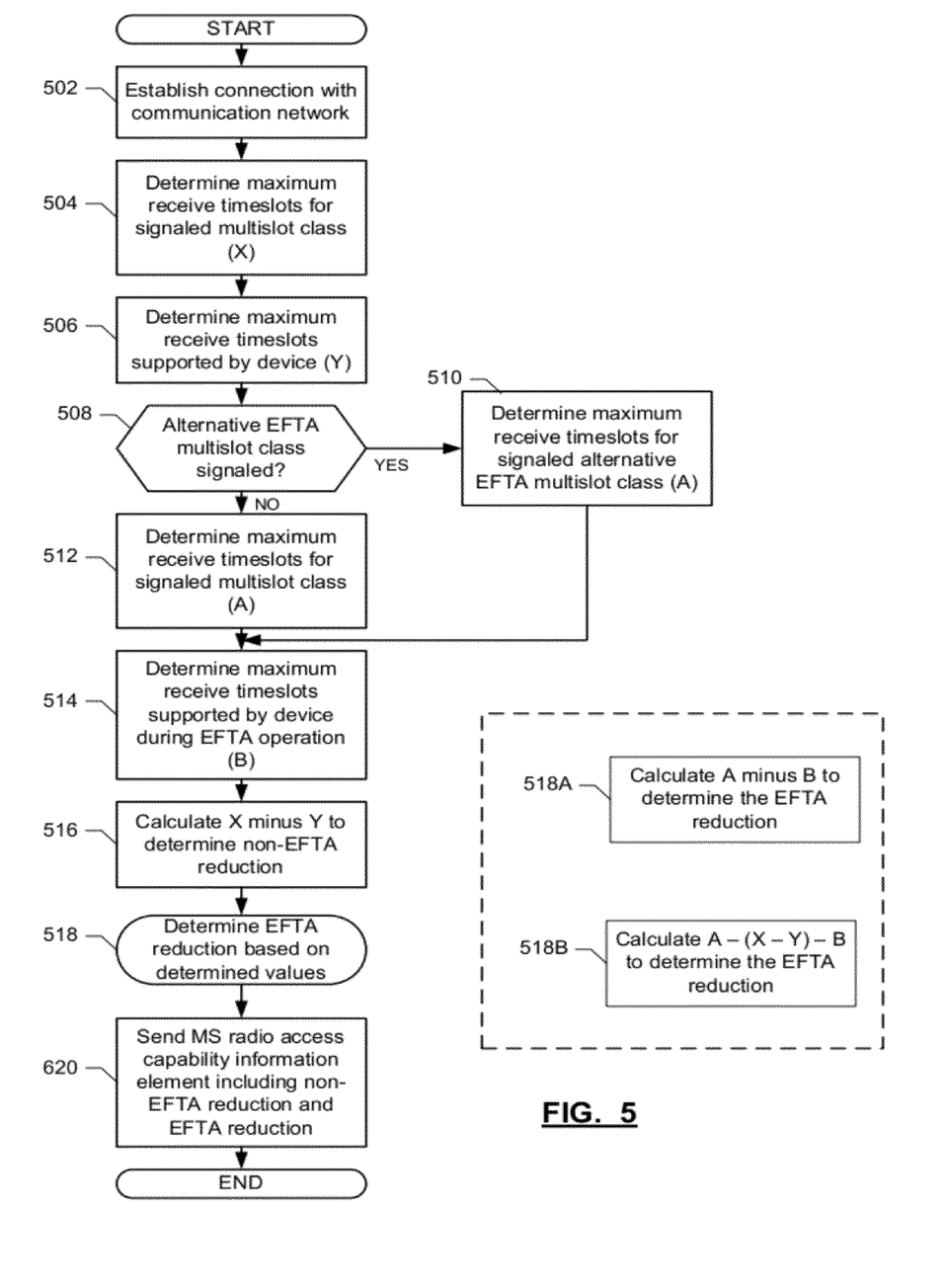
FIG. 5 is a flowchart illustrative of an example process to implement the DLDC reduction signal module of FIG. 2.

Flowcharts representative of example processes that may be carried out by the mobile station 100 are shown in FIGS. 3 and 5. In these examples, the process represented by each flowchart may be implemented by one or more programs comprising machine readable instructions for execution by: (a) a processor, such as the main processor 102 shown in the example mobile device 100 of FIG. 2, (b) a controller, and/or (c) any other suitable device, such as a digital signal processor (DSP). The one or more programs may be embodied in software stored on a tangible medium such as, for example, a flash memory, a CD-ROM, a floppy disk, a hard drive, a DVD, or a memory associated with the main processor 102, but the entire program or programs and/or portions thereof could alternatively be executed by a device other than the main processor 102 and/or embodied in firmware or dedicated hardware (e.g., implemented by an application specific integrated circuit (ASIC), a programmable logic device (PLD), a field programmable logic device (FPLD), discrete logic, etc.).

For example, any or all of the fast downlink frequency switching module 148 and the DLDC reduction signal module 150, or, for that matter, any of the functions shown in FIG. 1, could be implemented by any combination of software, hardware, and/or firmware. Also, some or all of the processes represented by the flowcharts of FIGS. 3 and 5 may be implemented manually. Further, although the example processes are described with reference to the flowcharts illustrated in FIGS. 3 and 5, many other techniques for implementing the example methods and apparatus described herein may alternatively be used. For example, with reference to the flowcharts illustrated in FIGS. 3 and 5, the order of execution of the blocks may be changed, and/or some of the blocks described may be changed, eliminated, combined and/or subdivided into multiple blocks.

FIG. 3 is a flowchart illustrative of an example process that may be used to implement the fast downlink frequency switching module 148 of FIG. 2. The example flowchart of FIG. 3 begins when a first receiver of communication subsystem 104 of the mobile device 100 receives data on a first tuned frequency from the network (block 302). According to the illustrated example, the mobile device 100 supports DLDC, but the network is operating in single carrier frequency hopping mode and, thus, the dual receiver capability of the mobile device 100 can be utilized with the single carrier mode. While the first receiver of the mobile device 100 is receiving data, the fast downlink frequency switching module 148 causes the second receiver to perform a neighbor cell measurement (block 304). For example, the second receiver may perform the neighbor cell measurement shortly before a frequency hop is to occur with enough time for the second receiver to complete the neighbor cell measurement and to tune to the next frequency.

After the neighbor cell measurement is complete (block 304), the fast downlink frequency switching module 148 causes the second receiver to tune to the next frequency to which the network will hop (block 306). For example, the frequency hopping scheme of the network may be known to the mobile device 100 by one or more of a lookup table, a predefined equation for determining the next frequency, a communication of the frequencies from the network, etc. Once the second receiver is tuned (block 306) and the network hops to the next frequency, the second receiver begins receiving data on the tuned frequency (block 308). Accordingly, there is little or no requirement for tuning delay to be accommodated between reception of data on either side of frequency hops. Thus, even when frequency hopping is used in the network, the mobile device 100 can support a maximum number of receiving timeslots in each TDMA frame (e.g., 8 timeslots per TDMA frame).

While the second receiver is receiving data (block 308), the fast downlink frequency switching module 148 causes the first receiver to perform a neighbor cell measurement (block 310) and tune to the next frequency (block 312) to prepare for a frequency hop. Accordingly, the mobile device 100 cycles between the first receiver and the second receiver alternately.

While the flowchart of FIG. 3 is illustrative of a process that is performed sequentially, the process illustrated by FIG. 3 may be performed in parallel. For example, at the same time that the first receiver is receiving data on the tuned frequency (block 302) the second receiver may be performing one or more of tuning to a neighbor cell measurement frequency, conducting a neighbor cell measurement (block 304), and/or tuning to the next frequency (block 306). Likewise, while the second receiver is receiving data on the next frequency (block 308), the first receiver may be performing one or more of tuning to a neighbor cell measurement frequency, conducting a neighbor cell measurement (block 310), and/or tuning to the next frequency (block 312). Alternatively, any other arrangement and timing of the blocks may be used. For example, some of the blocks may be performed in series and some of the blocks may be performed in parallel.

Additional blocks may be included in the process illustrated in FIG. 3. For example, the fast downlink frequency switching module 148 may additionally signal to network that the mobile device 100 supports fast downlink frequency switching. For example, the fast downlink frequency switching module 148 may transmit an MS Radio Access Capability information element to the network that includes a fast downlink frequency switching capability bit as illustrated below for 3GPP TS 24.008.

---

< Fast Downlink Frequency Switching Capability : bit >;
...
Fast Downlink Frequency Switching Capability (1 bit field)

This field indicates whether the mobile station supports fast downlink frequency switching between two consecutive TDMA frames.
    0        Fast downlink frequency switching not supported
    1        Fast downlink frequency switching supported

---

Example Field to be Included in the MS Radio Access Capability Information Element of 3GPP TS 24.008

Alternatively, the fast downlink frequency switching mobile 148 could signal the capability of receiving a maximum number of timeslots in other ways. For example, the fast downlink frequency switching module 148 could specify that Alternative EFTA classes apply to single carrier operation, but do not apply to DLDC, the fast downlink frequency switching module 148 could indicate that a maximum number of timeslots may be used and also indicate a DLDC reduction for EFTA to cause the maximum number of timeslots to be used in single carrier but a number of timeslots reduced by the DLDC reduction for EFTA in dual carrier operation, or Alternative EFTA classes could be defined so that a maximum number of receive timeslots map to a reduced number of receive timeslots per carrier in DLDC configuration. The described approaches could apply in all DLDC situations or could only apply when frequency hopping is used on at least one carrier or on the respective carrier. For example, if one carrier uses frequency hopping, but the other does not, the mobile device 100 may be able to support a maximum number of timeslots (e.g., 8 receive timeslots) on the non-hopping carrier and fewer timeslots (e.g., 7 receive timeslots) on the hopping carrier.

Figure 4:
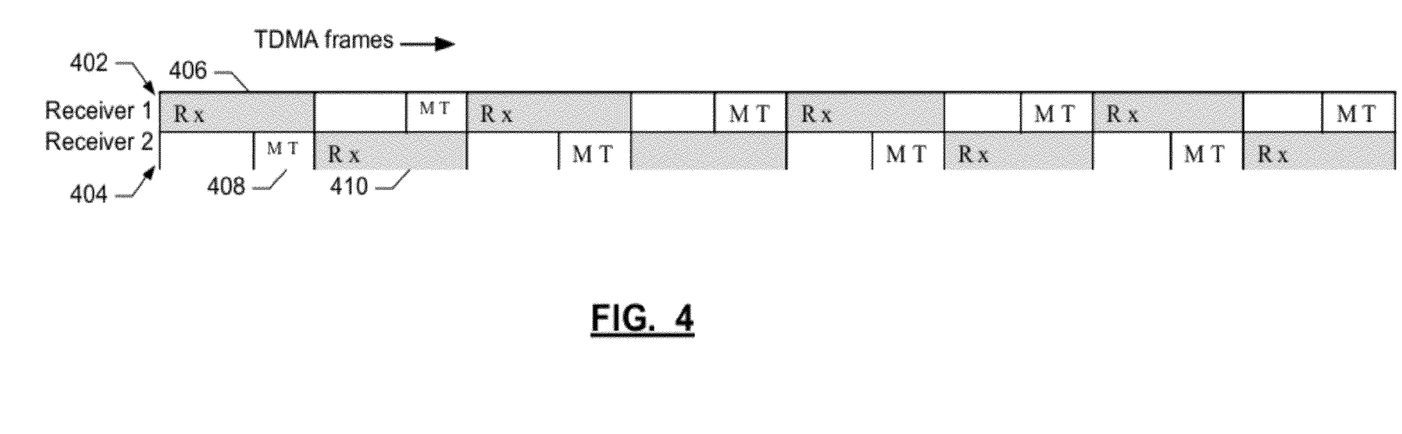
FIG. 4 illustrates the receiving relationship of an example first receiver and a second receiver.

FIG. 4 illustrates the receiving relationship of an example first receiver 402 and a second receiver 404 (e.g., receivers of the communication subsystem 104 of the mobile device 100). According to the illustrated example, the first receiver 402 is receiving data during a first time period 406. During a second time period 408 that is at least partially overlapping with the first time period 406, the second receiver 404 performs a neighbor cell measurement and tunes to a next frequency to which the network with hop. The first time period 406 ends when the network hops to a new frequency. When the network hops to a new frequency, the second receiver begins receiving data during time period 410. As shown in the illustrated example, because the second receiver performs neighbor cell measurement and tuning during time period 406, when time period 406 ends, the second receiver 410 can immediately or nearly immediately begin receiving data.

By way of example, Table 1 shows that some implementations of the system and method described herein can enable the parameter reflecting the time needed for the mobile device 100 (e.g., capable of receiving up to 8 timeslots within a single TDMA frame on a single radio frequency channel) to perform adjacent cell signal level measurements and get ready to receive data to be set to zero even when the network uses frequency hopping. Table 1 is adapted from 3GPP TS 45.002. In the table, Rx describes the maximum number of receive timeslots that the MS can use per TDMA frame, Tx describes the maximum number of transmit timeslots that the MS can use per TDMA frame, Sum is the total number of uplink (u) and downlink (d) TS that can actually be used by the MS per TDMA frame (in a single carrier configuration), $T_{ta}$ relates to the time needed for the MS to perform adjacent cell signal level measurement and get ready to transmit, $T_{tb}$ relates to the time needed for the MS to get ready to transmit data, $T_{ra}$ relates to the time needed for the MS to perform adjacent cell signal level measurement and get ready to receive, and $T_{rb}$ relates to the time needed for the MS to get ready to receive data. Similar implementations may apply for other multislot class mobile stations capable of receiving less than 8 timeslots.

TABLE 1

Classes for Multislot Capability

| Multislot class | Maximum number of slots | | | Minimum number of slots | | | | Type |
|---|---|---|---|---|---|---|---|---|
| | Rx | Tx | Sum | $T_{ta}$ | $T_{tb}$ | $T_{ra}$ | $T_{rb}$ | |
| 1 | 1 | 1 | 2 | 3 | 2 | 4 | 2 | 1 |
| 2 | 2 | 1 | 3 | 3 | 2 | 3 | 1 | 1 |
| 3 | 2 | 2 | 3 | 3 | 2 | 3 | 1 | 1 |
| 4 | 3 | 1 | 4 | 3 | 1 | 3 | 1 | 1 |
| 5 | 2 | 2 | 4 | 3 | 1 | 3 | 1 | 1 |
| 6 | 3 | 2 | 4 | 3 | 1 | 3 | 1 | 1 |
| 7 | 3 | 3 | 4 | 3 | 1 | 3 | 1 | 1 |
| 8 | 4 | 1 | 5 | 3 | 1 | 2 | 1 | 1 |
| 9 | 3 | 2 | 5 | 3 | 1 | 2 | 1 | 1 |
| 10 | 4 | 2 | 5 | 3 | 1 | 2 | 1 | 1 |
| 11 | 4 | 3 | 5 | 3 | 1 | 2 | 1 | 1 |
| 12 | 4 | 4 | 5 | 2 | 1 | 2 | 1 | 1 |
| 13 | 3 | 3 | NA | NA | a) | 3 | a) | 2 |
| 14 | 4 | 4 | NA | NA | a) | 3 | a) | 2 |
| 15 | 5 | 5 | NA | NA | a) | 3 | a) | 2 |
| 16 | 6 | 6 | NA | NA | a) | 2 | a) | 2 |
| 17 | 7 | 7 | NA | NA | a) | 1 | 0 | 2 |
| 18 | 8 | 8 | NA | NA | 0 | 0 | 0 | 2 |
| 19 | 6 | 2 | NA | 3 | b) | 2 | c1) | 1 |
| 20 | 6 | 3 | NA | 3 | b) | 2 | c1) | 1 |
| 21 | 6 | 4 | NA | 3 | b) | 2 | c1) | 1 |
| 22 | 6 | 4 | NA | 2 | b) | 2 | c1) | 1 |
| 23 | 6 | 6 | NA | 2 | b) | 2 | c1) | 1 |
| 24 | 8 | 2 | NA | 3 | b) | 2 | c2) | 1 |
| 25 | 8 | 3 | NA | 3 | b) | 2 | c2) | 1 |
| 26 | 8 | 4 | NA | 3 | b) | 2 | c2) | 1 |
| 27 | 8 | 4 | NA | 2 | b) | 2 | c2) | 1 |
| 28 | 8 | 6 | NA | 2 | b) | 2 | c2) | 1 |
| 29 | 8 | 8 | NA | 2 | b) | 2 | c2) | 1 |
| 30 | 5 | 1 | 6 | 2 | 1 | 1 | 1 | 1 |
| 31 | 5 | 2 | 6 | 2 | 1 | 1 | 1 | 1 |
| 32 | 5 | 3 | 6 | 2 | 1 | 1 | 1 | 1 |
| 33 | 5 | 4 | 6 | 2 | 1 | 1 | 1 | 1 |
| 34 | 5 | 5 | 6 | 2 | 1 | 1 | 1 | 1 |
| 35 | 5 | 1 | 6 | 2 | 1 | 1 + to | 1 | 1 |
| 36 | 5 | 2 | 6 | 2 | 1 | 1 + to | 1 | 1 |
| 37 | 5 | 3 | 6 | 2 | 1 | 1 + to | 1 | 1 |
| 38 | 5 | 4 | 6 | 2 | 1 | 1 + to | 1 | 1 |
| 39 | 5 | 5 | 6 | 2 | 1 | 1 + to | 1 | 1 |
| 40 | 6 | 1 | 7 | 1 | 1 | 1 | to | 1 |
| 41 | 6 | 2 | 7 | 1 | 1 | 1 | to | 1 |
| 42 | 6 | 3 | 7 | 1 | 1 | 1 | to | 1 |
| 43 | 6 | 4 | 7 | 1 | 1 | 1 | to | 1 |

TABLE 1-continued

Classes for Multislot Capability

| Multislot class | Maximum number of slots | | | Minimum number of slots | | | | Type |
|---|---|---|---|---|---|---|---|---|
| | Rx | Tx | Sum | $T_{ta}$ | $T_{tb}$ | $T_{ra}$ | $T_{rb}$ | |
| 44 | 6 | 5 | 7 | 1 | 1 | 1 | to | 1 |
| 45 | 6 | 6 | 7 | 1 | 1 | 1 | to | 1 | a) = 1 with frequency hopping.
   = 0 without frequency hopping.
b) = 1 with frequency hopping or change from Rx to Tx.
   = 0 without frequency hopping and no change from Rx to Tx.
c1) = 1 with frequency hopping or change from Tx to Rx.
    = 0 without frequency hopping and no change from Tx to Rx.
c2) Same values as for c1) apply except that, for the frequency hopping case,
$T_{rb}$ = 0 for a Downlink Dual Carrier capable MS indicating the corresponding multislot class as its alternative EFTA multislot class (see sub-clause B.5) and assigned a single carrier configuration.

In the example of Table 1, according to the system and method disclosed herein, the parameter reflecting the time needed for the mobile device 100 to perform adjacent cell signal level measurement or the BSIC decoding and get ready to receive data ($T_{ra}$) may be zero for multislot classes 24-29 when such measurements or BSIC decoding and preparation are performed by a second receive during a receive timeslot for a first receiver. According to current standards, Measurements or BSIC decoding are not expected of mobile devices which are assigned 7 or 8 downlink timeslots (regardless of whether or not frequency hopping is applied) in accordance with Table 2 (see notes 1 and 2):

TABLE 2

Multislot configurations for packet switched connections in A/Gb mode 3GPP TS 45.002

| Medium access mode | No of Slots (Note 0) | $T_{ra}$ shall apply | $T_{ta}$ shall apply | Applicable Multislot classes (see Note 7) | Note |
|---|---|---|---|---|---|
| Downlink, any mode | d = 1-6 | Yes | — | 1-12, 19-45 | |
| | d = 7-8 | No | — | 24-29 | 1, 2 |
| Uplink, Dynamic | u = 1-2 | Yes | — | 1-12, 19-45 | 10 |
| | u = 2 | — | Yes | 12, 36-39 | 11 |
| | u = 3 | — | Yes | 12, 37-39 | 9 |
| | u = 2-3 | Yes | — | 31-34, 41-45 | 9 |
| Uplink, Ext. Dynamic | u = 1-3 | Yes | — | 1-12, 19-45 | |
| | u = 4 | — | Yes | 12, 22-23, 27-29 | 2 |
| | u = 4 | Yes | — | 33-34, 38-39, 43-45 | 2 |
| | u = 5 | Yes | — | 34, 39 | 2, 3, 5 |
| | u = 5 | — | Yes | 44-45 | 2, 4 |
| | u = 6 | — | Yes | 45 | 2, 4, 5 |
| Down + up, Dynamic | d + u = 2-5, u < 3 | Yes | — | 1-12, 19-45 | 10 |
| | d + u = 6, u < 3 | Yes | — | 30-45 | 2, 3 |
| | d + u = 7, u < 3 | — | Yes | 40-45 | 2, 4 |
| | d = 2, u = 3 | Yes | — | 32-34, 42-45 | 9 |
| | d + u = 5, u = 2-3 | — | Yes | 12, 36-39 | 9 |
| | d + u = 6, u = 3-4 | Yes | — | 32-34, 37-39, 42-45 | 2, 3, 9 |
| | d + u = 7, u = 3-4 | — | Yes | 42-45 | 2, 4, 9 |
| | d = 4, u = 4 | Yes | — | 33-34, 38-39, 43-45 | 2, 3, 8, 9 |
| | d = 4, u = 5 | — | Yes | 44-45 | 2, 4, 8, 9 |
| | d + u = 8-10, u < 3 | Yes | — | 30-45 | 12 |
| Down + up, Ext. Dynamic | d + u = 2-4 | Yes | — | 1-12, 19-45 | |
| | d + u = 5, d > 1 | Yes | — | 8-12, 19-45 | |
| | d + u = 6-7, u < 4 | Yes | — | 10-12 | 8 |
| | d = 1, u = 4 | — | Yes | 12, 22-23, 27-29 | 2 |
| | d > 1, u = 4 | — | Yes | 12 | 2, 8 |
| | d = 1, u = 4 | Yes | — | 33-34, 38-39, 43-45 | 2, 6 |
| | d + u = 6, d > 1 | Yes | — | 30-45 | 2, 3 |
| | d = 1, u = 5 | Yes | — | 34, 39 | 2, 3, 5 |
| | d + u = 7-9, u < 5 | Yes | — | 31-34, 36-39 | 2, 3, 8 |
| | d > 1, u = 5 | Yes | — | 34, 39 | 2, 3, 5, 8 |
| | d = 1, u = 5 | — | Yes | 44-45 | 2, 4 |
| | d + u = 7, d > 1 | — | Yes | 40-45 | 2, 4 |
| | d = 1, u = 6 | — | Yes | 45 | 2, 4, 5 |
| | d + u = 8-11, u < 6 | — | Yes | 41-45 | 2, 4, 8 |
| | d > 1, u = 6 | — | Yes | 45 | 2, 4, 5, 8 |
| | d + u = 12-16, u > 2 | Yes | — | 30-39 | 12 |
| | d + u = 12-16, u > 2 | — | Yes | 40-45 | 12 |

Note 0 If the downlink timeslots assigned (allocated) to the mobile station are not contiguous, d shall also include the number of downlink timeslots not assigned (allocated) to the mobile station that are located between assigned (allocated) downlink timeslots. Similarly, if the uplink timeslots assigned (allocated) to the mobile station are not contiguous, u shall also include the number of uplink timeslots not assigned (allocated) to the mobile station that are located between assigned (allocated) uplink timeslots.
Note 1 Normal measurements are not possible (see 3GPP TS 45.008) except, for example, in the case of a downlink dual carrier capable MS operating in signal carrier mode using its second receiver for measurements regardless of the applicability of $T_{ra}$ or $T_{rb}$.
Note 2 Normal BSIC decoding is not possible (see 3GPP TS 45.008) except e.g. in case of a downlink dual carrier capable MS operating in single carrier mode using its second receiver for BSIC decoding regardless of the applicability of $T_{ra}$ or $T_{rb}$.
Note 3 TA offset required for multislot classes 35-39.
Note 4 TA offset required for multislot classes 40-45.
Note 5 Shifted USF operation shall apply (see 3GPP TS 44.060).
Note 6 The network may fallback to a lower multislot class and may not apply $T_{ra}$. A multislot class 38 or 39 MS shall in this case use $T_{ta}$ for timing advance values below 31.
Note 7 For dual carrier operation the Applicable Multislot class is the Signalled multislot class or the Equivalent multislot class (if different from the Signalled multislot class) as defined in Table B.2. For EFTA operation the Applicable Multislot class is the Signalled multislot class.
Note 8 These configurations can only be used for assignment to an MS supporting Flexible Timeslot Assignment (see 3GPP TS 24.008). For allocation additional restrictions apply.
Note 9 These configurations can be used only in RTTI configuration.
Note 10 These configurations can be used in RTTI configurations only when the timeslots of the corresponding downlink PDCH-pair are contiguous.
Note 11 These configurations can be used only in RTTI configurations when the timeslots of the corresponding downlink PDCH-pair are not contiguous.
Note 12 These configurations can only be used for assignment to an MS for which Enhanced Flexible Timeslot Assignment is used (see 3GPP TS 44.060). Whether normal measurements (see 3GPP TS 45.008) and/or normal BSIC decoding (see 3GPP TS 45.008) are possible will be dependent of allocation.

$T_{rb}$ reflects the effective switching time when no measurement is performed, while $T_{ra}$ reflects the time needed for the MS to perform adjacent cell signal level measurement and get ready to receive. According to current standards, the mobile station is not expected to perform adjacent cell signal level measurement when assigned or allocated some multislot configuration by the network (e.g., those where $T_{rb}$ is applicable instead $T_{ra}$). Also BSIC decoding may not be possible for some other multislot configurations. However, as described above, in accordance with the system and method disclosed herein, neighbor cell measurements and/or BSIC decoding and/or tuning are performed on a second receiver in parallel with receiving data on the first receiver. Accordingly, regardless of the applicability or the value of the $T_{ra}$ parameter for the relevant multislot configurations, neighbor cell measurements and/or BSIC decoding and/or neighbor cell measurement tuning may be performed on a second receiver in parallel with receiving data on a first receiver in accordance with note 1 and note 2 of Table 2, while a maximum number of receive timeslots may be available (e.g., 8 receive timeslots per TDMA frame).

FIG. 5 is a flowchart illustrative of an example process to implement the DLDC reduction signal module 150 of FIG. 2. The example flowchart of FIG. 5 begins when the mobile device 100 establishes a connection a communication network (block 502). For example, the mobile device 100 may send a mobility management ATTACH request to the network and response an ACCEPT response. Alternatively, any of several processes may be performed by the mobile device 100 until, at some time, the mobile device 100 undertakes to communicate the capabilities of the mobile device 100 to the network. The DLDC reduction signal module 150 then causes the mobile device 100 to determine the maximum number of receive timeslots for the signaled multislot class (referenced as X herein) (block 504). For example, Table 3 shows that when a mobile device declares signaled multislot class 33, the maximum number of downlink timeslots is 10. The DLDC reduction signal module 150 then determines the maximum number of receive timeslots supported by the device (referenced as Y) (block 506). For example, the DLDC reduction signal module 150 may determine that, despite the maximum number of downlink timeslots being 10 for the signaled multislot class 33, the processing capabilities of the mobile device 100 limit the device to processing 8 receive timeslots.

The DLDC reduction signal module 150 then determines if an alternative EFTA multislot class has been or is to be signaled (Block 508). When an alternative EFTA multislot class has been or is to be signaled, the DLDC reduction signal module 150 determines a maximum number of receive timeslots for the alternative multislot class for EFTA (referenced as A) (block 510). Alternatively, when an alternative EFTA multislot class has not been signaled, the DLDC reduction signal module 150 determines the maximum number of receive timeslots for the signaled multislot class (or uses the value determined in block 504) (referenced as A) (block 512). The DLDC reduction signal module 150 then determines the maximum number of receive timeslots supported by the mobile device 100 during EFTA operation (referenced as B) (block 514). In another implementation, block 514 may follow directly from block 510 and not 512 and control may then proceed to block 516. In such an implementation, block 518 may not be performed when an alternative EFTA multislot class is not signaled and control may proceed, instead, to block 516.

The DLDC reduction signal module 150 then calculates a non-EFTA reduction value by subtracting Y from X (block 516). In other words, the DLDC reduction signal module 150 subtracts the maximum number of receive timeslots supported by the device from the maximum number of receive timeslots for the signaled multislot class to determine the non-EFTA reduction value.

The DLDC reduction signal module 150 then determines the EFTA reduction value based on the values determined in one or more of blocks 504-514. For example, the DLDC reduction signal module 150 may determine the EFTA reduction value by subtracting B from A (block 518A). In other words, the DLDC reduction signal module 150 may subtract the maximum number of receive timeslots for the device during EFTA operation from the maximum timeslots for the alternative EFTA multislot class to determine the EFTA reduction value. Alternatively, the DLDC reduction signal module 150 may determine the EFTA reduction value by calculating A−(X−Y)−B. In other words, the DLDC reduction signal module may subtract the non-EFTA reduction value and the maximum number of receive timeslots for the device during EFTA operation from the maximum number of receive timeslots for the alternative EFTA multislot class to determine the EFTA reduction value.

After computing the non-EFTA reduction value (block 516) and the EFTA reduction value (block 518), the DLDC reduction signal module 150 causes the mobile device 100 to send MS radio access capability information including the non-EFTA reduction value and the EFTA reduction value to the network (block 520). Alternatively, any other type of information element or message could be used. Accordingly, a network element can utilize the non-EFTA reduction value and the EFTA reduction value to determine the capabilities of the mobile device 100 by subtracting the reduction values from the maximum values for the signaled class as defined, for example, in 3GPP TS 45.002.

TABLE 3

Multislot Class Values from 3GPP TS 45.002

| Signaled multislot class | Alternative EFTA multislot class | Maximum Number of downlink timeslots | Equivalent multislot class when "Multislot Capability Reduction for Downlink Dual Carrier" IE indicates reduction of: | | Note |
| --- | --- | --- | --- | --- | --- |
| | | | 0 or 1 timeslots | 2 or more timeslots | |
| 8 | — | 10 | 30 | 8 | — |
| 10 | — | 10 | 31 | 10 | — |
| 11 | — | 10 | 32 | 11 | — |
| 12 | — | 10 | 33 | 12 | — |
| 30 | — | 10 | — | — | — |
| 31 | — | 10 | — | — | — |
| 32 | — | 10 | — | — | — |
| 33 | — | 10 | — | — | — |
| 34 | — | 10 | — | — | — |
| 35 | — | 10 | — | — | — |
| 36 | — | 10 | — | — | — |
| 37 | — | 10 | — | — | — |
| 38 | — | 10 | — | — | — |
| 39 | — | 10 | — | — | — |
| 40 | — | 12 | — | — | — |
| 41 | — | 12 | — | — | — |
| 42 | — | 12 | — | — | — |
| 43 | — | 12 | — | — | — |
| 44 | — | 12 | — | — | — |
| 45 | — | 12 | — | — | — |
| 30-39 | None | 10 | — | — | 0 |
| 40-45 | None | 12 | — | — | 0 |
| 30-45 | 19-23 | 12 | — | — | 0 |
| 30-45 | 24-29 | 16 | — | — | 0 |

For example, an example information element to transmit the EFTA reduction value to the network is shown below based on 3GPP TS 24.008. This information element is provided as an example and other implementations may be used.

< Enhanced Flexible Timeslot Assignment Struct > ::=
 { 0 | 1 < Alternative EFTA Multislot Class : bit(4) >
 { 0 | 1 < Additional EFTA Multislot Capability Reduction for -continued Downlink Dual Carrier : bit (2) > } };
...
Additional EFTA Multislot Capability Reduction for Downlink Dual Carrier (2 bit field)

This field indicates an additional receive multislot capability reduction of a dual carrier capable mobile station applicable to EGPRS and EGPRS2 support (see 3GPP TS 45.002 [32]) for EFTA when an alternative EFTA multislot class is Signaled. The value of this field is additive to the value indicated by the Multislot Capability Reduction for Downlink Dual Carrier field. The field is coded as follows:

Bit 2 1
0 0   The MS supports 1 less receive timeslot than the value indicated by Multislot Capability Reduction for Downlink Dual Carrier
0 1   The MS supports 2 less receive timeslots
1 0   The MS supports 3 less receive timeslots
1 1   The MS supports 4 less receive timeslots If this field is not included, the value indicated by the Multislot Capability Reduction for Downlink Dual Carrier field applies for the alternative EFTA multislot class.

Example Field to be Included in the MS Radio Access Capability Information Element of 3GPP TS 24.008

The DLDC reduction signal module 150 may alternatively signal the network of the reduced receive capability for EFTA using a combination of a non-EFTA reduction value and an EFTA reduction value. An example implementation is illustrated in Table 4. The values in Table 4 are agreed upon by a supporting network and the mobile device 100. The values in Table 4 are chosen such that a network that does not support the updated configuration will not unnecessarily reduce the operation in EFTA (e.g., the legacy non-EFTA reduction value (multislot capability reduction for downlink dual carrier) is zero). However, the values in Table 4 are provided as an example and other implementations are possible.

As shown in Table 4, when the mobile device omits the EFTA reduction value (e.g., additional multislot capability reduction for downlink dual carrier for EFTA), the network will recognize the reduction value as the maximum number of receive timeslots for the signaled multislot class for the mobile device 100 minus the non-EFTA reduction value (e.g., multislot capability reduction for downlink dual carrier) (e.g., N-2). Alternatively, when the mobile device 100 can support more receive timeslots than the maximum number of receive timeslots for the signaled multislot class, the DLDC reduction signal module 148 will cause the mobile device 100 to send the non-EFTA reduction value as zero and set the EFTA reduction value appropriately. Based on the received values, the network will recognize the reduction value as the maximum number of receive timeslots applicable to the Alternative EFTA multislot class minus the EFTA reduction value.

TABLE 4

Reduction Values based on non-EFTA reduction value and EFTA reduction value

| Reduced receive capability for EFTA assignments (i.e. the maximum number of receive timeslots per TDMA frame in dual carrier) | "Multislot Capability Reduction for Downlink Dual Carrier" | "Additional Multislot Capability Reduction for Downlink Dual Carrier for EFTA" |
|---|---|---|
| ... | ... | ... |
| N − 2 | 2 | Omitted |
| N − 1 | 1 | Omitted |
| N = maximum number of receive timeslots for signalled multislot class (e.g. 10 for class 33) | 0 | Omitted |
| N + 1 | 0 | M − N − 1 |
| ... | 0 | ... |
| M − 2 | 0 | 2 |
| M − 1 | 0 | 1 |
| M = maximum number of receive timeslots for Alternative EFTA Multislot class (e.g. 16 for class 24) | 0 | 0 |

Figure 6:
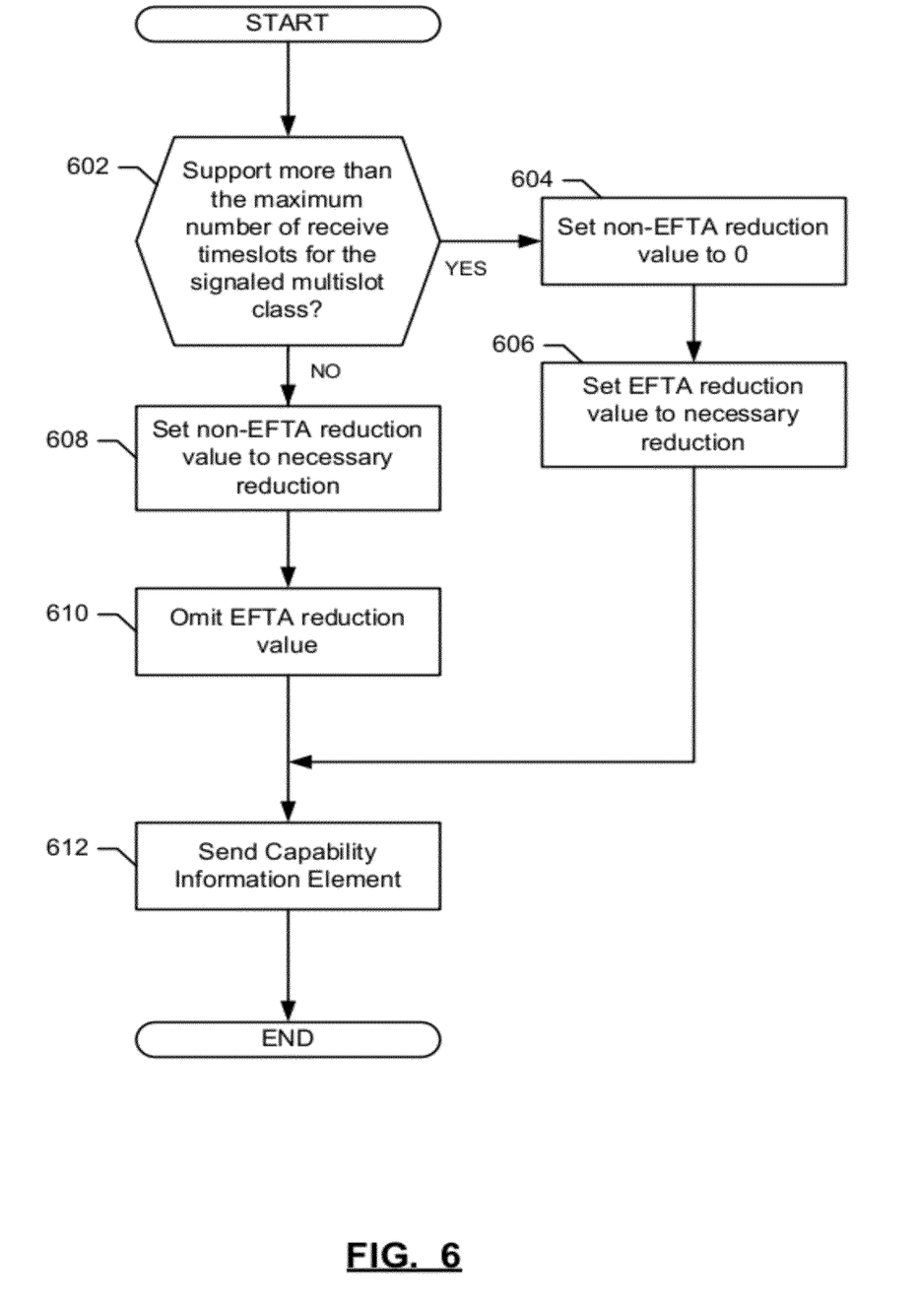
FIG. 6 is a flowchart illustrative of an example process to implement the DLDC reduction signal module of FIG. 2.

N = The maximum number of receive timeslots applicable to the signaled multislot class
M = The maximum number of receive timeslots applicable to the Alternative EFTA multislot class FIG. 6 is a flowchart representative of an example process to implement the DLDC reduction signal module 150 in accordance with the approach illustrated Table 4. When the DLDC reduction signal module 150 determines that it is time to signal the network of the receive timeslot capabilities of the mobile device 100, the flowchart of FIG. 6 begins with the DLDC reduction signal module 150 determining if the mobile device 100 supports more than the maximum number of receive timeslots for the signaled multislot class (block 602). For example, the signaled multislot class may indicate that 10 receive timeslots are supported, but the mobile device operating in DLDC may support, for example, 16 receive timeslots according to the maximum number of receive timeslots for alternative EFTA multislot class.

When the mobile device supports more receive timeslots than the maximum number of receive timeslots for the signaled multislot class (block 602), the DLDC reduction signal module 150 sets a non-EFTA reduction value (e.g., multislot capability reduction for downlink dual carrier) to zero (block 604). The DLDC reduction signal module 150 further sets an EFTA reduction value (e.g., additional multislot capability reduction for downlink dual carrier for EFTA) to a necessary reduction value (block 606). For example, if the maximum number of receive timeslots for alternative EFTA multislot class for the mobile device 100 is 16 and the mobile device 100 can only support 12 receive timeslots, the DLDC reduction signal module 150 will set the EFTA reduction value to 4. Control then proceeds to block 612, which is described below. According to the illustrated example, a legacy network element that does not support the additional EFTA reduction value, will receive the non-EFTA reduction value of zero and, thus, will determine that the mobile device 100 can support the maximum number of timeslots for the signaled multislot class.

When the mobile device does not support more receive timeslots than the maximum number of receive timeslots for the signaled multislot class (block 602), the DLDC reduction signal module 150 sets the non-EFTA reduction value to the necessary reduction (block 608). For example, if the mobile device can support up to 7 timeslots and the maximum number of receive timeslots for the signaled multislot class is 10, the DLDC reduction signal module 150 sets the non-EFTA reduction value to 3. The DLDC reduction signal module 150 also causes the EFTA reduction value to be omitted from the subsequent information element (block 610). For example, the DLDC reduction signal module 150 may cause the EFTA reduction value to be omitted by not causing the value to be added to the information element. By omitting the EFTA reduction value, the amount of data needed to be transmitted to the network can be reduced. Alternatively, any other method of signaling the network that the non-EFTA reduction should be used may be implemented. Control then proceeds to block 612.

After the DLDC reduction signal module 150 determines the appropriate non-EFTA reduction value and/or EFTA reduction value (blocks 604-606 and 608-610), the DLDC reduction signal module 150 causes the capability information element (e.g., a MS Radio Access Capability Information Element) including one or both of the non-EFTA reduction value and the EFTA reduction value to be transmitted to the network (block 612). While the illustrated example only describes the inclusion of the non-EFTA reduction value and the EFTA reduction value in the capability information element, any data may be included such as, for example, the data described in 3GPP TS 24.008.

Table 5 substrates an alternative to the approach described in conjunction with Table 4. The values in Table 5 are the same as Table 4, except for the case where the mobile device 100 supports the maximum number of receive timeslots for alternative EFTA multislot class. In this case, the DLDC reduction signal module 150 may set the non-EFTA reduction value to a value that is intended to be "reserved for future use" and omit the EFTA reduction value. Accordingly, a network element that supports the enhanced indicators will recognize such values as an indication that the mobile device 100 supports the maximum number of receive timeslots for alternative EFTA multislot class. Alternatively, a network element that does not support the enhanced indicators (e.g., a legacy network) will understand the "reserved for future use" value to be zero and will not reduce the number of receive timeslots below the maximum number of timeslots for the multislot class. The "reserved for future use" value may be any value that can be recognized by the network and understood to be zero by a legacy network. For example, the "reserved for future use" value could be the bit combination 111. Accordingly, signaling efficiency is achieved by not requiring the EFTA reduction value to be transmitted when maximum number of receive timeslots are supported. While the "reserved for future use" value is shown as being used in one particular instance, "reserved for future use" may be used in other instances.

TABLE 5

Reduction Values based on non-EFTA reduction value and EFTA reduction value

| Reduced receive capability for EFTA assignments (i.e. the maximum number of receive timeslots per TDMA frame in dual carrier) | Multislot Capability Reduction for Downlink Dual Carrier" | "Additional Multislot Capability Reduction for Downlink Dual Carrier for EFTA" |
|---|---|---|
| ... | ... | ... |
| N − 2 | 2 | Omitted |
| N − 1 | 1 | Omitted |

TABLE 5-continued

Reduction Values based on non-EFTA reduction value and EFTA reduction value

| Reduced receive capability for EFTA assignments (i.e. the maximum number of receive timeslots per TDMA frame in dual carrier) | Multislot Capability Reduction for Downlink Dual Carrier" | "Additional Multislot Capability Reduction for Downlink Dual Carrier for EFTA" |
|---|---|---|
| N = maximum number of receive timeslots for signaled multislot class (e.g. 10 for class 33) | 0 | Omitted |
| N + 1 | 0 | M − N − 1 |
| ... | 0 | ... |
| M − 2 | 0 | 2 |
| M − 1 | 0 | 1 |
| M = maximum number of receive timeslots for Alternative EFTA Multislot class (e.g. 16 for class 24) | "reserved for future use" | Omitted |

Although the above has been described with reference to certain specific embodiments, various modifications thereof will be apparent to those skilled in the art without departing from the scope of the claims appended hereto.

What is claimed is:

1. A method for a mobile station, the method comprising:
receiving first data on a first frequency using a first receiver of the mobile station in all timeslots of a first time division multiple access (TDMA) frame;
tuning to a second frequency using a second receiver while the first receiver is receiving the first data during the first TDMA frame; and
receiving second data on the second frequency using the second receiver during a first timeslot of a second TDMA frame that immediately follows the first TDMA frame.

2. The method of claim 1, wherein the frequencies of the first TDMA frame and the second TDMA frame are different.

3. The method of claim 1, further comprising performing a neighbor cell measurement using the second receiver while the first receiver is receiving the first data.

4. The method of claim 3, wherein the neighbor cell measurement is performed during the first TDMA frame.

5. The method of claim 1, further comprising transmitting an indication that the mobile station supports fast downlink frequency switching.

6. The method of claim 1, further comprising tuning to a third frequency using the first receiver while the second receiver is receiving the second data during the second TDMA frame.

7. A mobile station including hardware and software stored on a tangible computer readable medium that, during operation, cause the mobile station to:
receive first data on a first frequency using a first receiver of the mobile station in all timeslots of a first time division multiple access (TDMA) frame;
tune to a second frequency using a second receiver while the first receiver is receiving the first data during the first TDMA frame; and
receive second data on the second frequency using the second receiver during a first timeslot of a second TDMA frame that immediately follows the first TDMA frame.

8. The mobile station of claim 7, wherein the frequencies of the first TDMA frame and the second TDMA frame are different.

9. The mobile station of claim 7, wherein the hardware and software further cause the mobile station to perform a neighbor cell measurement using the second receiver while the first receiver is receiving the first data.

10. The mobile station of claim 9, wherein the neighbor cell measurement is performed during the first TDMA frame.

11. The mobile station of claim 7, wherein the hardware and software further cause the mobile station to transmit an indication that the mobile station supports fast downlink frequency switching.

12. The mobile station of claim 7, wherein the hardware and software further cause the mobile station to tune to a third frequency using the first receiver while the second receiver is receiving the second data during the second TDMA frame.

13. A non-transitory computer readable storage medium storing instructions that, when executed, cause a machine to at least:

receive first data on a first frequency using a first receiver of the mobile station in all timeslots of a first time division multiple access (TDMA) frame;

tune to a second frequency using a second receiver while the first receiver is receiving the first data during the first TDMA frame; and receive second data on the second frequency using the second receiver during a first timeslot of a second TDMA frame that immediately follows the first TDMA frame.

14. The non-transitory computer readable storage medium of claim 13, wherein the frequencies of the first TDMA frame and the second TDMA frame are different.

15. The non-transitory computer readable storage medium of claim 14, wherein the instructions, when executed, cause the machine to perform a neighbor cell measurement using the second receiver while the first receiver is receiving the first data.

16. The non-transitory computer readable storage medium of claim 15, wherein the instructions, when executed, cause the machine to perform the neighbor cell measurement during the first TDMA frame.

17. The non-transitory computer readable storage medium of claim 13, wherein the instructions, when executed, cause the machine to transmit an indication that the mobile station supports fast downlink frequency switching.

18. The non-transitory computer readable storage medium of claim 13, wherein the instructions, when executed, cause the machine to tune to a third frequency using the first receiver while the second receiver is receiving the second data during the second TDMA frame.

\* \* \* \* \*